United States Patent [19]
Silverstein

[11] Patent Number: 6,009,068
[45] Date of Patent: Dec. 28, 1999

[54] COMPACT DISC CHANGER

[75] Inventor: Paul W. Silverstein, Miami, Fla.

[73] Assignee: CD Server Corporation, Miami, Fla.

[21] Appl. No.: 08/923,815

[22] Filed: Sep. 4, 1997

Related U.S. Application Data

[60] Provisional application No. 60/025,833, Sep. 5, 1996.

[51] Int. Cl.[6] ................................................... G11B 17/04
[52] U.S. Cl. .............................................................. 369/178
[58] Field of Search ................................... 369/34, 36, 38, 369/75.1, 77.1, 178, 194

[56] References Cited

U.S. PATENT DOCUMENTS

| | | | |
|---|---|---|---|
| 4,616,357 | 10/1986 | Nakayama | 369/194 |
| 4,691,309 | 9/1987 | Suzuki | 369/38 |
| 5,062,092 | 10/1991 | Siryj et al. | 369/38 |
| 5,123,001 | 6/1992 | Nakamichi et al. | 369/36 |
| 5,218,593 | 6/1993 | Kaneo et al. | 369/77.1 |
| 5,431,520 | 7/1995 | Brugger | 414/277 |
| 5,481,514 | 1/1996 | Yamasaki et al. | 369/36 |
| 5,629,910 | 5/1997 | McReynolds et al. | 369/38 |
| 5,748,596 | 5/1998 | Nakamichi | 369/77.1 |
| 5,754,518 | 5/1998 | Dang et al. | 369/191 |
| 5,878,011 | 3/1999 | Nakamichi | 369/75.2 |

*Primary Examiner*—David L. Ometz
*Assistant Examiner*—Angel Castro
*Attorney, Agent, or Firm*—YI LI

[57] ABSTRACT

An apparatus for selectively inserting and removing compact discs into and out of a disc drive tray. A removable cartridge which holds multiple compact discs provides environmentally safe storage for the discs.

4 Claims, 4 Drawing Sheets

Representative View

Computer Front Panel

Representative View

Front View

Top View

Side View

COMPACT DISC CHANGER

CROSS-REFERENCES TO RELATED APPLICATIONS

This application claims the benefit of U.S. provisional application Ser. No. 60/025,833, filed Sep. 5, 1996.

BACKGROUND OF THE INVENTION

1. Field of the Invention

This invention relates to a method and apparatus for storing compact discs and inserting and retrieving them into and from a computer disc drive.

2. Description of the Related Art

Millions of personal computers have an internal compact disc (CD) drive. Many of these drives handle one disc at a time. These discs are manually inserted into a tray which moves the disc into position to be read or written on. Other configurations have employed CD changer mechanisms to facilitate the use of several (as many as seven) CD's which can be moved from a storage position to the read or write position. In these prior art configurations, the drive and changer mechanism comprise one unit. This makes it difficult to upgrade the drive portion of the computer without replacement of the changer portion also. Further, the prior art changer mechanisms have generally been adapted from audio changers, and are unduly complex and unreliable for high-duty-cycle computer applications. Moreover, the prior art mechanisms cannot be used to store the CDs on the shelf in a handy, environmentally safe, container, adapted for easy selection and use with the computer.

OBJECTS OF THE INVENTION

Several objects and advantages of the present invention are:

(a) to provide a CD changer apparatus which can be used with existing computer drive mechanisms to provide reliable, safe, and convenient use of multiple compact discs;

(b) to provide environmentally safe, convenient storage for multiple CDs when not installed in a computer drive;

(c) to provide a changer apparatus for use with computers which is independent of the computer disc drive mechanism, permitting replacement of the disc drive mechanism without affecting the CD changer.

DESCRIPTION OF THE PREFERRED EMBODIMENTS

Figure 1:
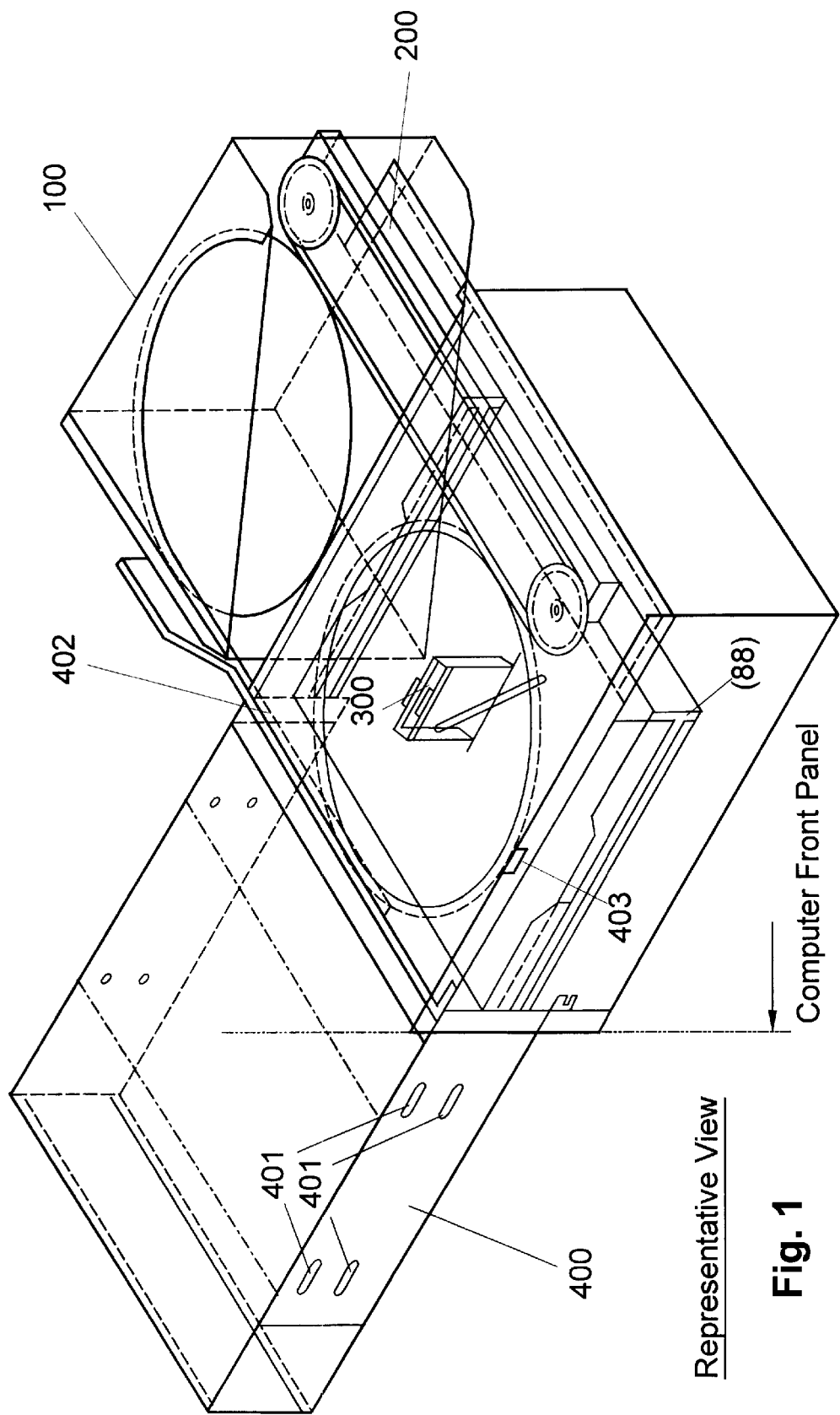
FIG. 1 is a representative overview of the CD changer of the present invention, showing the base structure 400, the cartridge assembly 100, the belt assembly 200 and the elevator assembly 300.

FIG. 1 illustrates mounting bracket 400, with elongated mounting holes 401. To install the CD changer in conjunction with a CD drive unit, the CD drive unit is removed from a computer, and the CD changer is inserted into the computer along with the CD drive. Alignment holes 401 permit adjustment of the position of the CD changer to facilitate centering the CD changer with the tray of the CD drive unit. Since the CD drives use a 5¼ form factor, the four existing screw mountings will automatically align the other centerline. When installed, the CD changer projects from the front panel of the computer (computer front panel position noted on FIG. 1) and surrounds the position of the drive tray. The cartridge extends to the right of the computer as shown. Various computer front panel designs may require modifications of the design shown, but all such designs would be configured such that the elevator (300) could insert and remove CDs to and from the drive tray (88). In an alternate configuration, the CD changer could be a stand-alone unit, the CD drive mechanism being removed from the computer and installed in the stand-alone unit, still utilizing the elevator to place CDs in and out of the tray.

Figure 2:
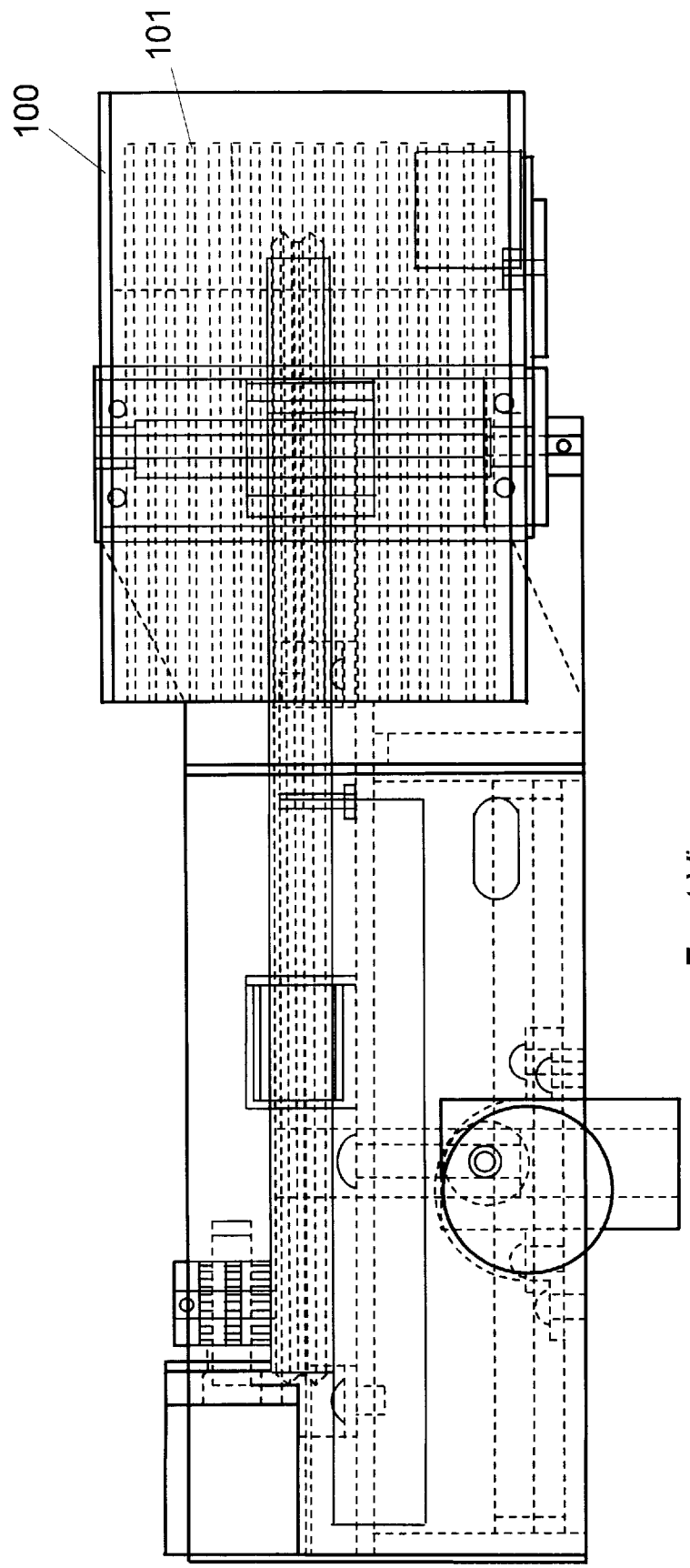
FIG. 2 is a front view of the CD changer.
Figure 3:
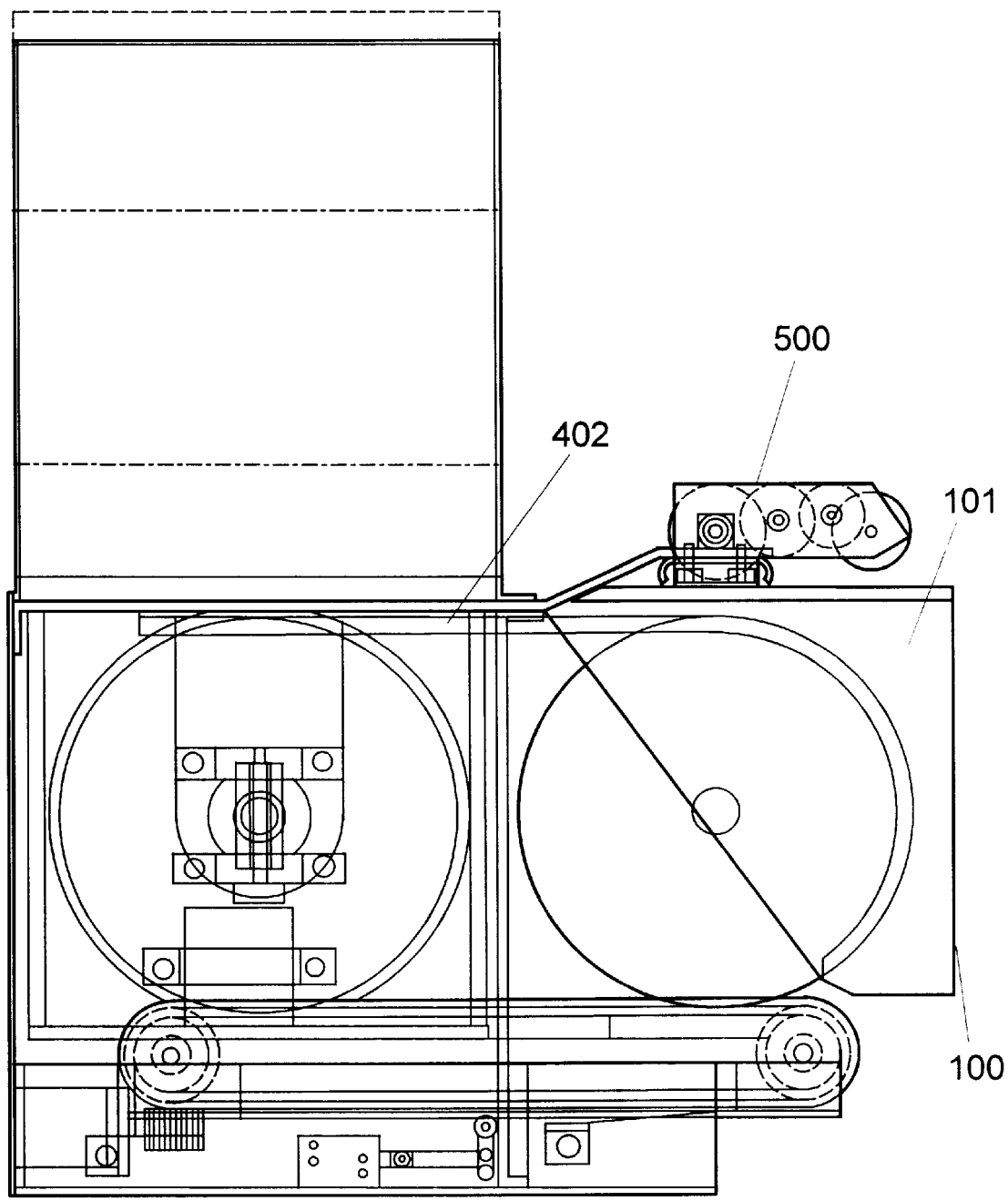
FIG. 3 is a top view of the CD changer.
Figure 4:
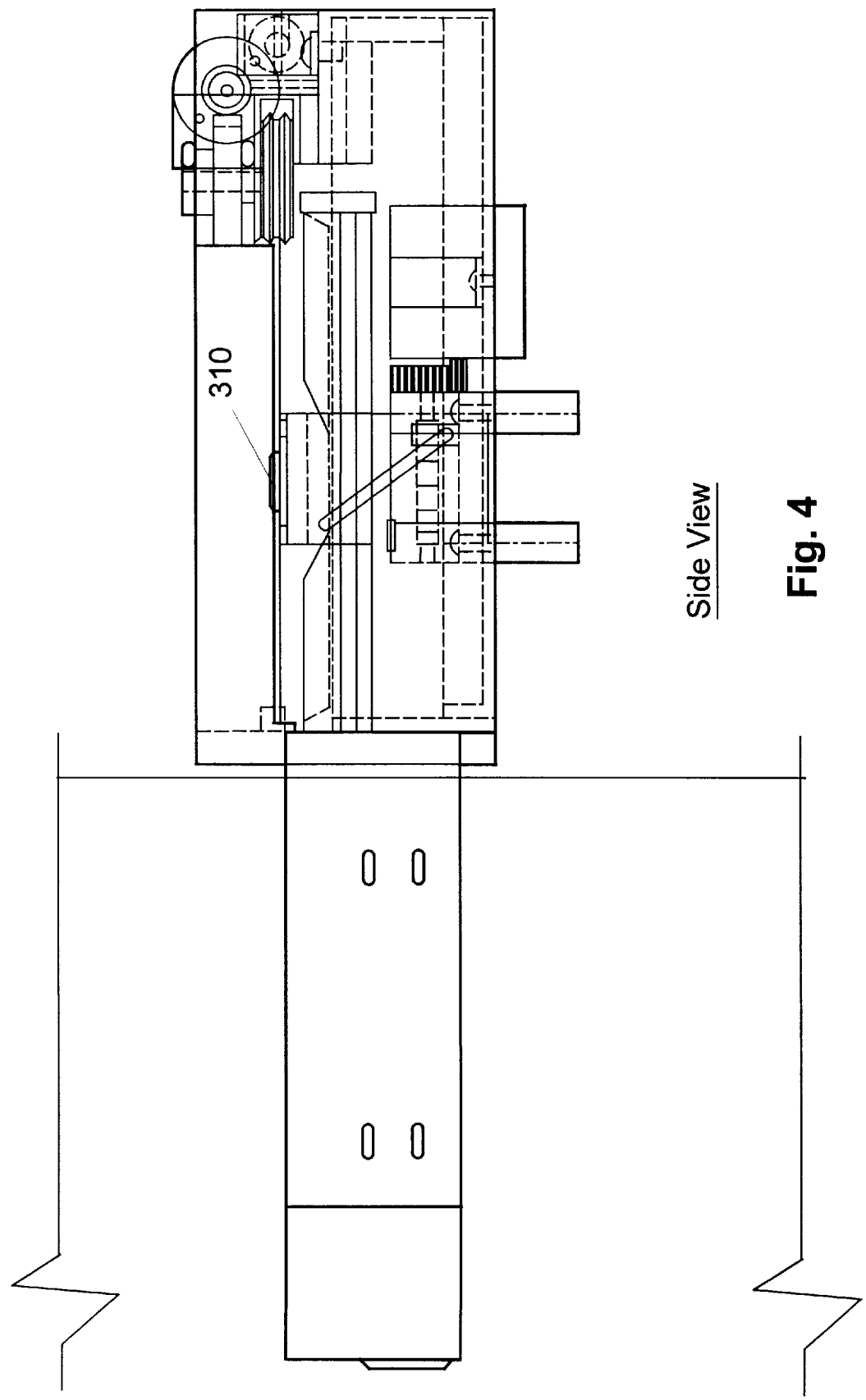
FIG. 4 is a side view of the CD changer.

Compact discs are manually inserted into cartridge assembly 100. Up to eighteen compact discs can be inserted into the cartridge. The cartridge need not be full, fewer discs could be loaded leaving empty slots in the cartridge. Also, the number of slots per cartridge is a matter of design preference, eighteen being a representative number. As shown in FIGS. 2 and 3, the slots are deep enough to grip approximately half the circumference of each disc, to support the discs which will be in the horizontal plane when the cartridge is inserted into the CD changer.

Cartridge 100 is loaded into position on the CD changer by sliding it into engagement with selector assembly 500 (FIG. 3).

Selector assembly 500 positions the cartridge so that one of the cartridge slots is aligned with the stationary transfer track 402. The process of inserting or removing the cartridge is accomplished manually, with no need for electrical power. When the CD changer is first turned on, the cartridge is initialized by first moving it to the full down position, then moving it to the center position (between discs 9 and 10) to put the cartridge in an optimum position to facilitate indexing to any disc.

With the cartridge loaded with compact discs and installed, the operation of the CD changer is as follows:

Step One: (All commands are references to commands given by an internal CPU, not shown.) Issue commands to simultaneously:

a. Initiate transfer belt spinup: (In its initial position, the transfer belt is not in contact with a compact disc. Belt assembly 200 is at its "idle" position, free to move without contacting a compact disc. In its engaged position, the belt assembly is moved into engagement with the compact disc, by moving laterally against springs biased to hold the belt assembly in the idle position. The moving force is provided by a solenoid shown in FIG. 3.)

b. Open computer tray: (When the CD changer is installed in the computer, an electrical interface is established between the CD changer and the computer via a connection made through the keyboard port on the computer to allow communication between the CD changer CPU and the computer.)

c. Move the cartridge to align a selected disc with the plane of the belt. (The selector assembly moves the cartridge to position the compact disc.)

Step Two: In an average access, 600 msec is used for the compact disc to be moved into alignment with the belt and stationary track. When the disc is properly positioned, in the same plane with the belt and with its slot aligned with the stationary transfer track (402), the belt assembly is commanded to move into the engaged position. This drives the compact disc out of the cartridge and along the transfer track until the CD contacts a stop at position (403) of the base structure, at which point an increase in current of the drive motor caused by the increased drive requirement is sensed, and the motor is turned off. The compact disc is now supported on one side by the stationary track and on the other side by the transfer belt, the compact disc being centered over the elevator assembly (300). (The motor assembly includes a clutch which consists of a small drive belt which engages two different-sized pulleys which provide the gear reduction necessary as well as a clutch action when the belt slips over the pulleys.) At this point, the tray may still be moving into position, since it can take up to one second to open fully.

Step Three: After a calculated predetermined time interval the elevator starts to move upward timed not to interfere with the opening tray.

Step Four: The elevator impales the compact disc at its center hole; the belt assembly is commanded to move back to the idle position, out of contact with the compact disc; the elevator assembly then lowers the compact disc into the drive tray and continues moving downward to its lowest position. At this point, the tray closes in the normal manner to load the compact disc to a reading or writing position.

Returning the compact disc to the cartridge is accomplished by reversing the procedure described above. The computer tray is opened at a calculated predetermined time interval. The elevator assembly starts upward. The elevator engages the center hole of the compact disc (the drive tray by then being fully open) and lifts the compact disc upwards to the plane of the transfer track. The transfer belt then engages the edge of the compact disc, and the belt drives the compact disc back towards the cartridge. The elevator is lowered below the plane of the transfer track and the belt conveys the compact disc back to a cartridge slot. If another compact disc is not immediately needed, the drive tray closes; if another compact disc is to be loaded, the selector assembly, belt and elevator assembly operates as described above to transfer the selected disc and load the disc into the drive tray, except that Step Three (opening the tray) is not required. Of course, it is not necessary that the compact disc be returned to the slot it came from. There may be times when there are less than eighteen compact discs in the cartridge that it may be desired to change the position of the compact discs by shuffling them to different, empty slots.

Although the description given above contains many specifications, these should not be construed as limiting the scope of the invention but as merely providing illustrations of some of the presently preferred embodiments of the invention. Thus the scope of the invention should be determined by the appended claims and their legal equivalents, rather than by the examples given.

What is claimed is:

1. Automatic compact disc changer apparatus for moving compact discs between a cartridge and a CD drive mechanism, wherein said CD drive mechanism has a movable tray assembly, said automatic compact disc changer is external to said CD drive mechanism; wherein said automatic compact disc changer comprises:

a base structure;

a cartridge supported by said base structure, said cartridge being useful to hold said compact discs in close proximity to each other;

an elevator assembly supported by said base structure adapted to pass through said movable tray assembly when said movable tray assembly is opened, and to lift said compact discs into and out of said movable tray assembly;

a drive mechanism supported by said base structure for contacting selected compact discs one at a time, along an edge portion of each respective compact disc, and for maintaining contact with said edge portion while driving said selected disc between said cartridge and said elevator assembly;

a stationary transfer track supported by said base structure adapted to support the opposite edge of said selected disc from said driven edge portion; and a selector assembly supported by said base structure for positioning said cartridge so that one selected compact disc is aligned with said stationary transfer track.

2. Automatic compact disc changer apparatus in accordance with claim 1, wherein said drive mechanism comprises a flexible belt for contacting each said selected disc to effect rotational movement to drive said disc.

3. Automatic compact disc change apparatus in accordance with claim 2, wherein said compact discs are maintained in a horizontal plane as they are moved between said cartridge and said elevator assembly.

4. Automatic compact disc change apparatus in accordance with claim 1, having attachment means for aligning said CD drive mechanism with said elevator assembly, aligning a center position of said movable tray assembly to a center portion of said elevator assembly.

* * * * *